United States Patent [19]
White

[11] 3,956,934
[45] May 18, 1976

[54] LIQUID LEVEL INDICATOR FOR PRESSURIZED LIQUID CONTAINER

[76] Inventor: Joseph Montague White, No. 8 Ansell St., Portsmouth, Va. 23703

[22] Filed: Aug. 20, 1975

[21] Appl. No.: 606,211

[52] U.S. Cl. .................................. 73/323; 222/155
[51] Int. Cl.² .......................................... G01F 23/02
[58] Field of Search ............ 73/323, 324, 325, 326, 73/327, 328, 332, 333; 222/155

[56] References Cited
UNITED STATES PATENTS

| | | | |
|---|---|---|---|
| 270,416 | 1/1883 | Gnadinger, Jr. | 73/323 |
| 1,075,025 | 10/1913 | Drautzburg | 73/323 |
| 1,078,325 | 11/1913 | Vickrey | 73/323 |
| 1,089,188 | 3/1914 | Carew | 73/323 |
| 1,156,998 | 10/1915 | Heberling | 73/323 |
| 3,212,335 | 10/1965 | Guiffre | 73/328 |
| 3,311,267 | 3/1967 | Lee et al. | 73/323 X |

*Primary Examiner*—James J. Gill
*Assistant Examiner*—Joseph W. Roskos
*Attorney, Agent, or Firm*—Fleit & Jacobson

[57] ABSTRACT

A liquid level indicator for a container such as a beer keg or the like in which a supply of liquid is maintained under pressure from an associated source of pressurized gas and having an outlet arranged to be connected to a dispensing conduit for conducting the liquid from the container to the point of use at a remote location, which includes a gauge tube of transparent material having a check valve therein, the upper end of the gauge tube and the container communicating with the associated source of pressurized gas for normally maintaining the check valve in the closed condition and for pressurizing the liquid in the container, the lower end of the gauge tube communicating with the dispensing conduit to thereby establish liquid communication between the container and the gauge tube so that the level of liquid in the gauge tube continously corresponds to the level of liquid in the container while the check valve in the gauge tube maintains liquid in the gauge tube during the dispensing of the liquid from the container through the dispensing conduit.

10 Claims, 3 Drawing Figures

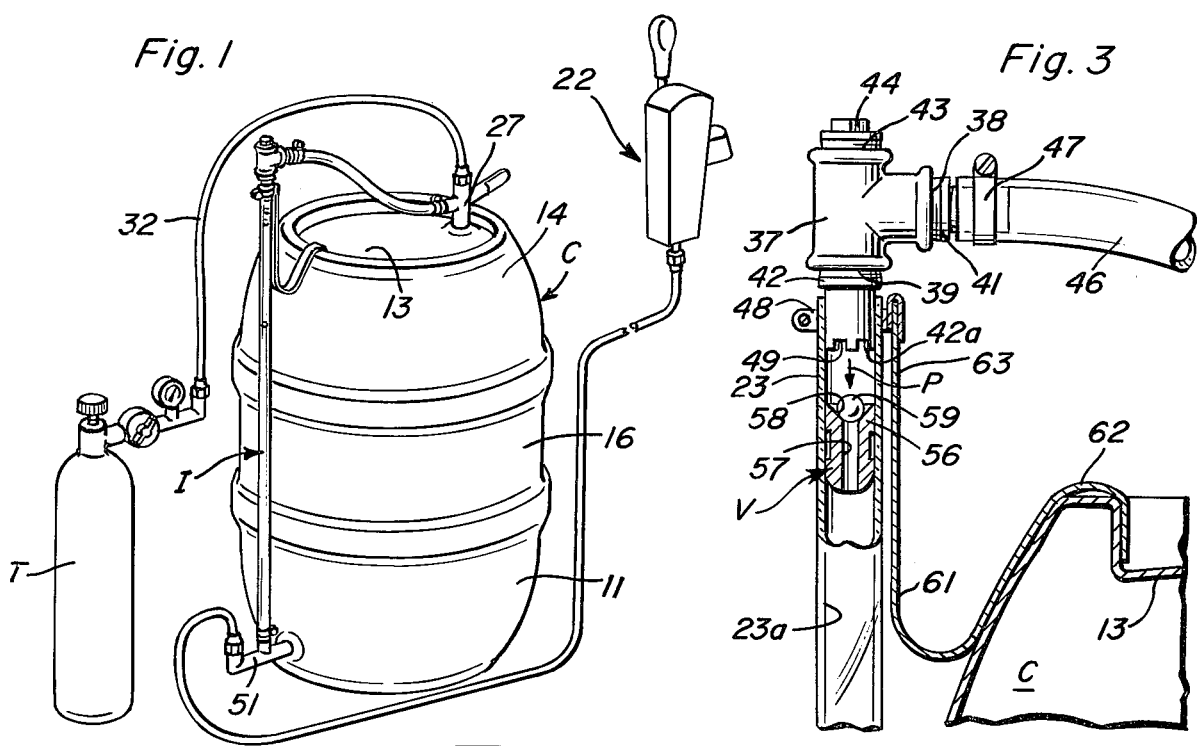
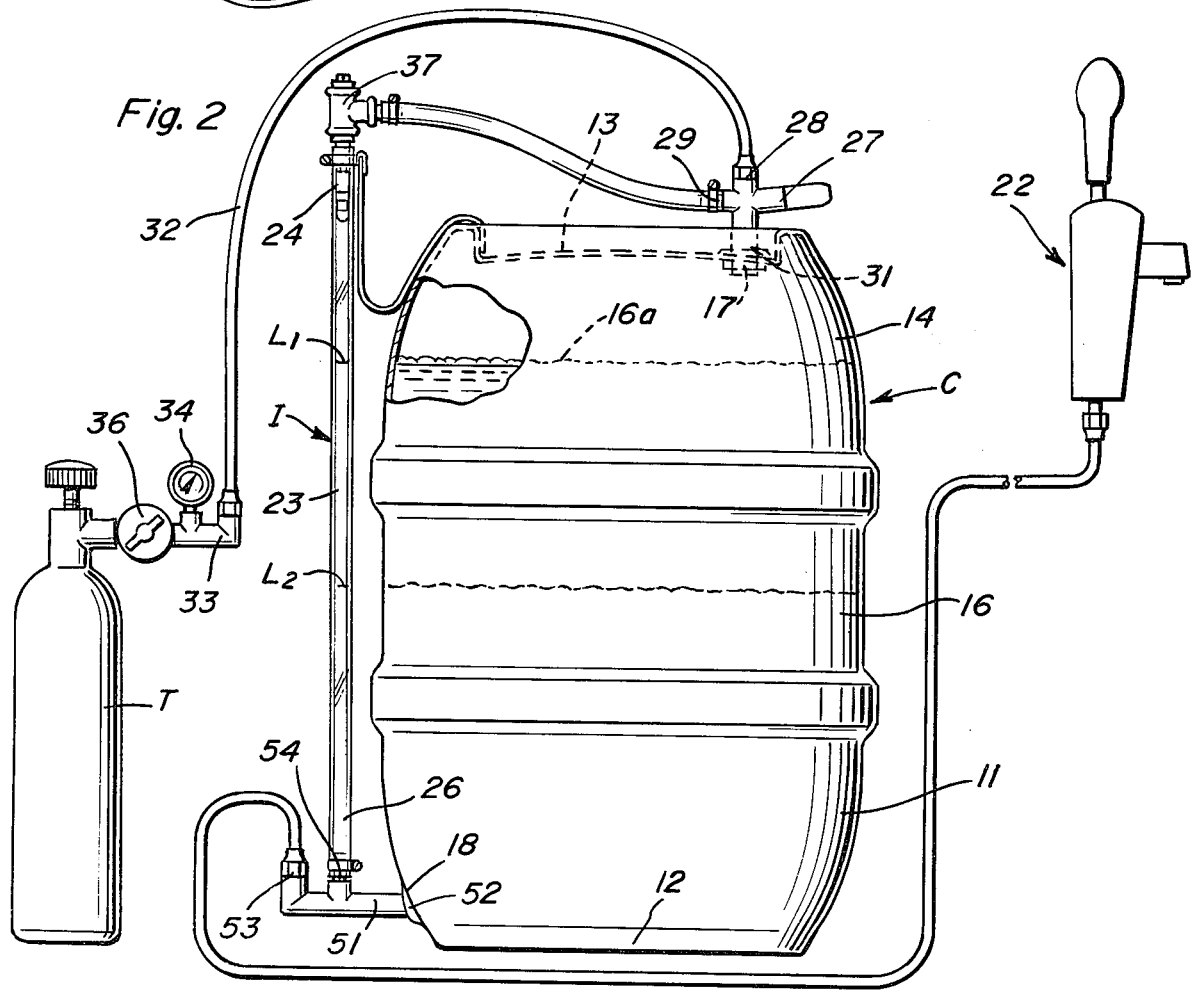

LIQUID LEVEL INDICATOR FOR PRESSURIZED LIQUID CONTAINER

BACKGROUND OF THE INVENTION

Often it is desirable to provide a visual indication of the level of liquid in a container of opaque material such as wood, metal or the like. To this end, a common practice has been to utilize a vertically extending tube or sight gauge preferably of transparent material such as glass provided with suitable gradations. The lower end of the tube is connected in communication with the liquid in the container so that the liquid level in the tube and container will remain the same when the pressure which may be atmospheric pressure, on the surface of the liquid in the container and tube is the same. In such an arrangement, as liquid is removed from the container, the level of liquid in the tube follows the liquid level in the container thereby providing as a continuous indication of the quantity of liquid in the container.

Since such a sight gauge is of simple and inexpensive construction, it has been proposed to utilize such a gauge with a liquid container wherein the liquid is maintained under pressure as in a beer keg or the like. As is well known, the supply of liquid or beer in a container such as a beer keg is maintained under a constant pressure by means of a pressurized gas for periodic dispensing of the liquid from the container and conveyance of the liquid to a point of use at a remote location. However, such an adaptation has presented certain problems in in that the liquid in the sight gauge which is connected in liquid communication with the interior of the container through the dispensing conduit, must be subjected to the same pressure as that of the liquid in the container for the liquid levels in the gauge and container to remain the same. Therefore, gas by means of which pressure is maintained in the container is introduced into the upper end of the sight gauge so that the same pressure applied to the surface of the liquid in the container is applied to the surface of the liquid in the sight gauge with the result that the liquid levels remain the same and the sight gauge provides a visual indication of the quantity of liquid in the container. However, in such an arrangement, as a result of the liquid communication between the container and the sight gauge, the dispensing of a quantity of liquid from the container is accompanied by the ejection of the liquid in the gauge tube under the force of the pressurized gas introduced into the top of the gauge tube and the attendant presence of gas in the dispensing conduit.

It has therefore been proposed to provide an on-off, manually operated valve in the conduit which connects the lower end of the gauge tube with the container dispensing conduit which valve is normally maintained in the closed condition during periodic dispensing of liquid from the container. When an indication of the liquid level in the container is to be obtained, the valve is opened to permit the liquid to flow from the container into the tube with equal pressure being maintained on the liquid in the container and tube thereby permitting the liquid level in the tube to assume the level of the liquid in the container and providing a visual level indication.

It can be readily understood however, that as long as the valve remains in the closed condition, the liquid level in the gauge tube will remain unchanged even though the level of liquid in the container drops due to dispensing of the liquid therefrom. It is therefore necessary to open the valve to permit the liquid level in the sight gauge to drop to the level of the liquid in the container for a visual level indication and then reclose the valve for further dispensing. An example of such a level indicator and more particularly a beer keg is shown in U.S. Pat. No. 3,311,267 entitled Measuring Attachment For Beer Keg of the Like issued March 28, 1967, to R. L. Lee et al. The disadvantages of such a prior art structure can be easily seen in that the true level of liquid in the container can be observed on the sight gauge only after the valve has been opened and reclosed which is not only time consuming and inconvenient but does not provide a continuous indication of the level of the liquid in the container.

Accordingly, the primary object of this invention is to provide a new and novel liquid level indicator for a container such as a beer keg of the like.

Another object of this invention is to provide a new and novel liquid level indicator for a container of the type in which liquid to be dispensed is maintained under pressure.

A further object of this invention is to provide a new and novel liquid level indicator for a pressurized container such as a beer keg which accurately indicates the liquid level in the container at all times and which is unaffected by the dispensing of liquid under pressure from the container.

This invention further contemplates a new and novel liquid level indicator for a beer keg in which beer is maintained in a pressurized condition for periodic dispensing which is simple and inexpensive in construction, which may be easily attached to a keg of the type commonly provided by breweries and the like for marketing beer, which utilizes a minimum of readily available low cost component parts and which continuously provides an indication of the liquid level in the beer keg from a full condition to an empty condition.

SUMMARY OF THE INVENTION

In general, the objects stated above and other related objects in this invention are accomplished by the provision of a gauge tube of transparent material having an upper end and a lower end with means for detachably mounting the tube on the exterior of a container such as beer keg having means including an inlet for communicating the interior of the container with an associated source of pressurized gas and a dispensing outlet for the liquid in the container. Means are provided for communicating the gauge tube upper end with the associated source of pressurized gas and conduit means are connected to the container outlet and to the gauge tube lower end for conducting liquid from the container into the gauge tube lower end and to a point of use at a remote location. A check valve is disposed within the gauge tube adjacent the gauge tube upper end for preventing rapid flow of pressurized gas introduced into the gauge tube upper end through the valve during dispensing whereby the liquid level in the gauge continues to correspond to the liquid level in the container as the liquid is removed from the container and the liquid is maintained in the gauge tube during the dispensing of the liquid from the container.

The novel features which are believed to be characteristic of the invention are set forth with particularity in the appended claims. The invention itself, however, both as to its organization and method of operation may be best understood by reference to the following description taken in conjunction with the accompanying drawings.

BRIEF DESCRIPTION OF THE DRAWINGS

FIG. 1 is a perspective view of a level indicator constructed in accordance with the invention shown in the installed position on a container;

FIG. 2 is a side view of the indicator of FIG. 1; and

FIG. 3 is an enlarged sectional view of a portion of the level indicator of FIG. 2.

DETAILED DESCRIPTION OF THE DRAWINGS

Referring now to the drawings and to FIG. 1 in particular, there is shown a container designating generally by the letter "C" with which the level indicator of the invention designated generally by the letter "I" is associated. The level indicator "I" is shown in the mounted position on the container "C" which may be of any suitable conventional construction having a side wall 11, a bottom wall 12, a top wall 13 defining an interior 14 for containing a supply of liquid 16 to be periodically dispensed. The container "C" also is provided with an inlet 17 on the top wall 13 and an outlet 18 adjacent the bottom 12 of the container.

In the illustrated embodiment, the container "C" is a keg of conventional construction formed of metal or the like which has been filled with beer usually by a brewery from which the beer is dispensed in the conventional manner by the customer usually the proprietor of establishments such as bars, cocktail loungers, restaurants, etc. As is well known, the keg "C" is received by the customer in the filled condition with the liquid or beer 16 at level 16a, and with the inlet 17 and outlet 18 in the sealed condition. The supply of liquid 16 in the keg "C" is maintained in a pressurized condition by the presence of a pressurized gas such as compressed gas or the like above the liquid level 16a in the container interior 14.

As referred to above, the conventional beer keg "C" has the inlet 17 positioned in the upper wall 13, which is preferably recessed as shown, and the outlet 18 positioned preferably in the side wall 11 adjacent the bottom wall 12 in the lower portion of the container through which the liquid or beer is dispensed. In the customer's installation, means are provided for communicating the interior 14 of the container "C" with an associated source of pressurized gas such as a compressed gas tank "T" through the container inlet 17 to maintain a predetermined pressure on the liquid surface 16a. This pressure is maintained on the liquid surface 16a permitting the liquid or beer to be dispensed from the keg "C" through the outlet 18 by conduit means including a tube 21 connected to a suitable dispensing valve or faucet 22 at a remotely located point of use.

As specifically illustrative of the invention, the level indicator "I" includes a gauge tube 23 of transparent material preferably a clear synthetic resinous material such as polypropylene, PVC, or the like, having an upper end 24 and a lower end 26 which is arranged to be mounted exteriorly of the container or keg "C" in a substantially vertically extending position adjacent the container side wall 11.

Means are provided for communicating the upper end 24 of the gauge tube 23 with an associated source of pressurized gas such as the tank "T". More specifically, a tap fitting such as a T-fitting 27 having an inlet 28 and a pair of outlets 29 and 31 is arranged to be mounted on the container "C" with one of the outlets, namely outlet 31 connected to the container inlet 17 in sealing relationship therewith in the conventional manner.

The inlet 28 of the T-fitting 27 is connected by means of a tube 32 with the outlet 33 of the tank "T" preferably provided with an on/off valve 34 and a combination pressure regulator and gauge 36. In the open position of the valve 34 the pressurized gas from the container "T" therefore flows through the tube 32 and T-fitting 27 into the interior 14 of the container "C" to maintain the liquid or beer 16 under constant pressure.

The associated end of pressurized gas "T" is also connected to the upper end 24 of the gauge tube 23 so as to introduce the pressurized gas into both the container interior 14 and tube upper endd 24. More specifically, a connector 37 is provided preferably in the form of a T-fitting having an inlet 38 and an outlet 39 in which are disposed hose fittings 41 and 42, respectively. The connector or T-fitting is of conventional construction including another outlet 43 closed by means of a plug 44.

The connector inlet 38 is connected by means of a tube 46 preferably also of a synthetic resinous material such as polyethelene or the like, to the other outlet 29 of the fitting 27. The tube 46 is preferably connected at one end to the inlet 38 of connector 37 by suitable clamping means such as a hose clamp 47 which clamps the tube end to the hose fitting 41.

The connector outlet 39 is connected to the gauge tube 23 by insertion of the hose fitting within the upper end of the gauge tube 23 and clamped therein by means of a hose clamp 48 or the like of conventional construction. Preferably, the outer end edge portion 42a of the hose fitting 42 is provided with a plurality of axially extending, circumferentially spaced slots 49 for cleaning purposes.

The conduit means through which the liquid 16 is removed from the keg or container "C" for dispensing through the faucet 22 includes a tap fitting 51 having an inlet 52 and a pair of outlets 53 and 54. The tap fitting inlet 52 is mounted in the conventional manner in the container outlet 18 in communication with the supply of liquid 16 and one of the outlets namely outlet 53 is connected to one end of tube 21 as shown best in FIG. 2. The other outlet 54 of the tap fitting 51 is suitably connected to the lower end 26 of the gauge tube 23 so that the liquid 16 is permitted to flow both into tube 21 and outwardly into gauge tube 23.

The level indicator "I" includes a check valve designated generally by the letter "V" which is disposed within the interior of the gauge tube 23 as shown best in FIG. 3. The check valve "V" is preferably mounted in the tube 23 in a press-fitting relationship with the inner wall 23a of the gauge tube 23 and preferably in an elevated position adjacent the tube upper end 24 above the top of the container "C".

The valve "V" includes a body 56 formed of a metalic material such as brass or the like having a central passage 57 and a concave valve seat 58 at its upper end. The valve "V" also includes a spherical valve member or ball 59 preferably of a suitable plastic material which is disposed within the valve seat 58 as shown in FIG. 3 so that the pressurized gas introduced into the upper end of the tube 23 urges the ball 59 into sealing engagement with the valve seat 58.

Means are provided for mounting the gauge tube 23 on the exterior of the container "C" in a substantially vertically extending position as shown in the drawings. More specifically, a strap member 61 is provided which is of substantially U-shaped configuration having a hook portion 62 at one end engageable with the upper edge of the container "C" adjacent the top wall 13 as shown best in FIG. 3. The other end 63 of the strap member 61 is attached to the tube 23 adjacent the tube upper end 24 in any suitable manner such as by utilizing the hose clamp 48 to thereby support the gauge tube 23 on the container "C" in a secure, suspended condition permitting ready attachment and detachment.

In the operation of the invention with the indicator "I" and associated parts in the installed position on a filled container "C" as shown best in FIG. 1, and connected to the associated source of pressurized gas "T", as explained above the liquid supply 16 in the tank is maintained under pressure and the ball valve member 59 is urged into the sealing engagement with the valve seat 58 by the pressurized gas acting in the direction of the arrow "P" of FIG. 3. As the pressure of the gas in the container and in the gauge tube 23 is the same, the liquid in the container "C" moves through the outlet 18, fitting 51 and fitting outlet 54 up into the tube 23 so that the liquid in the gauge tube 23 and container "C" is at the same level, for instance level "L," in tube 13 when the liquid in the container is at level 16a, since gas at the same pressure is above the liquid surfaces in both the tube 23 and container "C". It should be understood the check valve "V" does not completely close when the ball member 59 is urged by the pressurized gas into seating engagement with the valve seat 58. A very small degree of gas leakage is permitted between the ball member 59 and seat 58 so that a pressure differential across the valve "V" is slowly equalized and the gas pressure eventually becomes the same on both sides of the valve "V."

When valve 22 is opened to dispense liquid at the point of use, the liquid in container "C" flows through container outlet 18, fitting 51, fitting outlet 53 and through tube 21 to faucet 22, and the level of liquid in the container "C" drops by way of example to level "L₂". During such dispensing of the liquid, although the lower end 26 of the tube 23 is in communication with the liquid flowing through fitting 51 and tube 21, the liquid will remain in tube 23 since the check valve "V" is in the closed condition by virtue of the pressure of the gas maintaining the ball member 59 in closing engagement with the valve seat 58. This operation can be readily understood in that during dispensing, the liquid level in tube 23 will fall somewhat accompanied by a pressure drop in the gas above the liquid level in the tube until equilibrium conditions are reached. Since the dispensing operation is of relatively short duration, the closed valve blocks the rapid passage of high pressure gas through the valve so that the gauge tube liquid is unaffected.

After the dispensing valve 22 is closed and the liquid level in the container is, for example, at the level "L₂", the liquid level in the tube 23 will quickly assume a level corresponding to that of the liquid level in the container "C" by virtue of the gradual passage of pressurized gas through the ball member 59 and valve seat 58 and central bore 57 to equalize the pressure on both sides of valve "V" and therefore pressurized the liquid in gauge tube 23 at the same pressure as that of the liquid in the container "C". Thus although the drop in the liquid level of tube 23 may lag the drop of the liquid in container "C", such lag is negligible in time and the liquid level indicator "I" for all practical continuously corresponds to the liquid level in container "C".

Accordingly, with the present invention, it is possible to provide a pressurized vessel, such as a beer keg, with a level indicator which continuously shows the level of liquid within a closed tank. Importantly, the inventive level indicator is uncomplicated and is operational without the necessity for manually actuated valving. When liquid is dispensed, the level indicator automatically tracks the level of the liquid in the container.

Above, there has been described a specific embodiment of the present invention. It should be understood, however, that this embodiment has been described for illustrative purposes only and is in no way intended to limit the scope of the present invention. Rather, it is the intention that the present invention be limited only as defined in the accompanying claims.

What is claimed is:

1. A level indicator for continuously displaying the level of a supply of liquid in a pressurized container having an inlet for communicating the interior of the container with an associated source of pressurized gas and an outlet for the liquid, the level indicator comprising, in combination: a gauge tube of transparent material having an upper end and a lower end; means for vertically mounting said gauge tube on the exterior of the container; means for communicating said gauge tube upper end with the associated source of pressurized gas whereby the pressure in the upper end of the container interior is substantially the same as in said gauge tube upper end; conduit means connected to the container outlet and to said gauge tube lower end for conducting liquid from said container into both said gauge tube and to a remote use location; and a check valve disposed in said gauge tube at said gauge tube upper end for substantially blocking the rapid flow of pressurized gas from said gauge tube upper end to said gauge tube lower end; whereby the liquid is continuously maintained in said gauge tube at a level corresponding to the liquid level in said container throughout variations in the level of liquid in said container as the liquid is periodically dispensed from said container.

2. A level indicator in accordance with claim 1, wherein said check valve comprises: a body member having a central bore therethrough and a concave valve seat at one end thereof; and a ball member positioned in said seat, for being urged in substantial sealing relationship with said valve seat by the pressure in said gauge tube upper end.

3. The level indicator in accordance with claim 2, wherein said check valve is disposed in said tube in a vertical position above the highest level of liquid in said container.

4. A level indicator in accordance with claim 1, wherein said gauge tube is formed of a synthetic resinous material; and wherein said check valve is disposed in pressfitting relationship with the inner wall of said gauge tube in a selected axial position.

5. A level indicator in accordance with claim 1, wherein said mounting means comprises a strap member having a hooked portion at one end for engagement with the upper end of said container and means for attaching the other end of said strap member to said gauge tube to support said tube in a substantially verticaly position adjacent said container.

6. A level indicator in accordance with claim 1, wherein said conduit means includes a tap fitting having a pair of outlets connected to said container outlet, one of said tap fitting outlets being connected to said gauge tube lower end and a conduit connected to the other outlet of said tap fitting for conducting the liquid in said container to a remote use location.

7. A level indicator in accordance with claim 6, wherein said container inlet includes a connector having an inlet and an outlet, a conduit, means for connecting one end of said conduit to said connector inlet, means for connecting the other end of said conduit with the interior of said container, and means for connecting the outlet of said connector to the upper end of said gauge tube.

8. A level indicator in accordance with claim 7, wherein said means for connecting said container outlet to said gauge tube upper end includes a hose fitting having one end in communication with said connector outlet and the other end in communication with said gauge tube upper end, and having an end edge portion provided with a plurality of circumferentially spaced, axially extending slots and a releasable clamp for clamping said hose fitting other end to said gauge tube upper end.

9. A level indicator in accordance with claim 8, wherein said container inlet includes a T-fitting having an inlet and a pair of outlets, one of said T-fitting outlets being connected to said container inlet to mount said T-fitting on said container, means for communicating said T-fitting inlet to said associated source on pressurized gas, and means for communicating the other of said T-fitting outlets to the upper end of said gauge tube and said associated source of pressurized gas.

10. A level indicator for continuously displaying the level of a supply of beer in a pressurized keg of opaque material, the keg having a top wall associated with an inlet, a bottom wall associated with an outlet and means for communicating the interior of said keg through said inlet with an associated source of pressurized gas, the level indicator comprising: a gauge tube of transparent material having an upper end and a lower end; a first fitting having an inlet connected to said keg outlet and an outlet connected to both said gauge tube lower end and a conduit for conducting beer from said keg to a remote use location; a second fitting having an inlet connected to said source of pressurized gas for conducting said pressurized gas to the interior of said keg and an outlet connected to both said ket inlet and said gauge tube upper end; a check valve disposed within said gauge tube adjacent said gauge tube upper end for preventing the rapid flow of pressurized gas from said source through said gauge tube, said check valve including a body member having a central bore and a concave valve seat at one end, a ball member positioned in said seat with said ball member being urged into substantial sealing relationship with said valve seat by said pressurized gas whereby the liquid level in said gauge tube continuously corresponds to the level of beer in said container; and mounting means for mounting said gauge tube in a substantially vertically extending position exteriorly of said keg.

* * * * *